United States Patent [19]

Holly

[11] Patent Number: 4,746,217
[45] Date of Patent: May 24, 1988

[54] INTERFEROMETRIC TILT SENSOR

[75] Inventor: Sandor Holly, Woodland Hills, Calif.

[73] Assignee: Rockwell International Corporation, El Segundo, Calif.

[21] Appl. No.: 52,928

[22] Filed: May 22, 1987

[51] Int. Cl.$^4$ .............................................. G01B 9/02
[52] U.S. Cl. ..................................... 356/349; 356/363
[58] Field of Search ............................... 356/349, 363

[56] References Cited

U.S. PATENT DOCUMENTS

| | | | |
|---|---|---|---|
| 3,930,734 | 1/1976 | Holly et al. | 356/111 |
| 4,188,122 | 2/1980 | Massie et al. | 356/349 |
| 4,213,704 | 7/1980 | Burns et al. | 356/349 |
| 4,334,779 | 6/1982 | Domey et al. | 356/358 |
| 4,395,123 | 7/1983 | Minott | 356/363 X |
| 4,525,068 | 6/1985 | Mannava et al. | 356/349 X |
| 4,526,471 | 7/1985 | Bykov et al. | 356/373 |

FOREIGN PATENT DOCUMENTS 768890 10/1967 Canada .............................. 356/363

Primary Examiner—Davis L. Willis
Assistant Examiner—Mathew W. Koren
Attorney, Agent, or Firm—H. Fredrick Hamann; Harry B. Field; Lawrence N. Ginsberg

[57] ABSTRACT

An apparatus and method for remotely sensing the angular displacement of a test surface 22. Two coherent collimated light beams 10,12 having different optical frequencies are directed toward optically reflective target areas 18,20. The beams are reflected and converge to form a fringe pattern in an interference zone 24. A sampling means 34 having at least one sampling aperture is positioned within the interference zone 24. The sampling aperture lies in a plane substantially perpendicular to a plane formed by the converging beams and it has a width smaller than the effective spatial period of the fringe field, $\lambda_{es}$, where $\lambda_{es}=\lambda_s/\cos\phi$, $\lambda_s$ being the spatial period of the finge field and $\phi$ being the angular deviation of the plane of the sampling aperture from a plane which is perpendicular to the fringe planes of the fringe field. A light detector 42 is positioned to receive the modulated optical radiation which is sampled from the interference zone. This modulated optical radiation is converted into a sample electronic signal. Any rotation of the test surface 22 about the X-axis which is normal to the converging light beams is sensed by comparing the phase of the sample electronic signal to the phase of a reference electronic signal having a frequency equal to the frequency difference between the two light beam 10,12.

28 Claims, 4 Drawing Sheets

INTERFEROMETRIC TILT SENSOR

BACKGROUND OF THE INVENTION

1. Field of the Invention

The present invention relates to a method and apparatus for measuring the angular displacement of a surface and more particularly the invention relates to using Lateral Heterodyne Interferometry (LHI) to measure the angular displacement of a surface.

2. Description of the Prior Art

There has been a long felt need for a non-contact system for measuring the angular displacement of surfaces. This need has been amplified recently with the upcoming manufacture and utilization of the space station. For the space station, long but lightweight structural elements will be utilized to support optical and mechanical components which are required to be precision aligned and kept in precision alignment with respect to each other.

The present applicant is a co-inventor of the subject matter claimed in U.S. Pat. No. 3,930,734 entitled "Process and Apparatus for Sensing Magnitude and Direction of Lateral Displacement" which utilizes Lateral Heterodyne Interferometry to measure linear displacement of slits, gratings and other surfaces which are equipped with periodic perturbations. The technique was extended, in that teaching, to the measurement of the rotation of a disk or drum by measuring the quasi-linear lateral displacement of slits that are placed around the edge of the object that rotates.

OBJECTS AND SUMMARY OF THE INVENTION

It is a primary object of the invention to provide non-contact sensing of the angular displacement of a test surface.

Another object of the invention is to use Lateral Heterodyne Interferometry to measure the angular displacement of the test surface remotely and with high angular resolution.

Other objects, advantages and novel features of the present invention will become apparent from the following detailed description of the invention when considered in conjunction with the accompanying drawings.

In its broadest aspects, the invention comprises directing two collimated light beams toward separate, optically reflective, good optical quality target areas on a test surface. The light beams are of substantially the same intensity and are coherent with respect to one another. However, the beams differ in frequency. The beams are directed to reflect off of their respective target areas and to converge at a distance from the test surface thus forming a fringe pattern in an interference zone and producing an optical radiation field which is spatially and temporally modulated by the difference in frequency, $\Delta f$, between the two beams. The fringe pattern continuously moves laterally along a direction perpendicular to the fringe planes of the interference zone at a rate equal to $\Delta f$. A sampling means is positioned within the interference zone for sampling the laterally moving fringe pattern. The sampling means has at least one sampling aperture exposed to the interference zone. The long dimension of the sampling aperture lies substantially perpendicular to a plane formed by the converging light beams and has a width (measured normal to the long dimension) smaller than the effective spatial period of the fringe field, $\lambda_{es}$, where $\lambda_{es} = \lambda_s / \cos\phi$, $\lambda_s$ being the spatial period of the fringe field and $\phi$ being the angular deviation of the plane of the sampling aperture from a plane which is perpendicular to the fringe planes. A light detector is positioned to receive the modulated optical radiation which is sampled from the interference zone and the modulated optical radiation is converted into a sample electronic signal by associated electronic circuits. Rotation of the test surface about the X-axis which is normal to the converging light beams is sensed by comparing, on a continuous basis, the phase of the sample electronic signal to the phase of a reference electronic signal having a frequency equal to $\Delta f$.

Use of this lateral heterodyne interferometric approach provides remote sensing of any angular displacement of the test surface with high angular resolution. Precise measurements of the extent and direction of a relative angular displacement may be made by measuring the magnitude and direction of the phase shift between the sample electronic signal and the reference electronic signal.

The sampling means may include, for example, a slitted element or a grating element. A type of slitted element may comprise a transparent support structure with an opaque surface formed on one side. The opaque surface has at least one slit formed therein. When a slitted element is utilized, the laterally moving fringe pattern is sampled by transmission of light through the slit(s) of the slitted element. When a grating element is used as a sampling means a light detector is positioned to detect scattered radiation from the grating element.

BRIEF DESCRIPTION OF THE DRAWINGS

FIG. 8b is a graph of the fringe field intensity distribution which is made to spatially match the periodicity of the slits of FIG. 8a.

The same elements or parts throughout the figures are designated by the same reference characters.

DETAILED DESCRIPTION OF THE PREFERRED EMBODIMENTS

Figure 1:
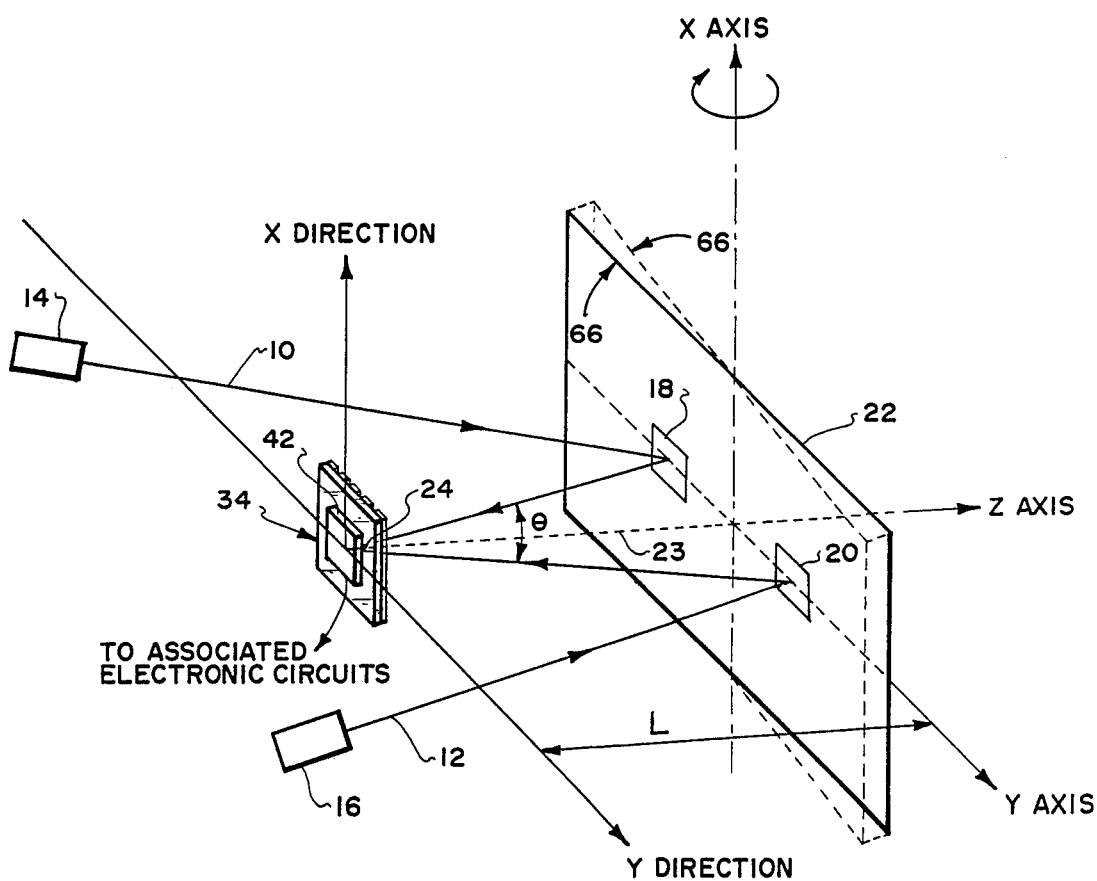
FIG. 1 is a diagrammatic illustration of an "on-axis" embodiment of the present invention.

Referring to FIG. 1, two coherent light beams 10 and 12 from sources 14, 16 are directed toward separate target areas 18,20 on a test surface 22. The target areas 18,20 must each be optically reflective and have good optical quality. As used herein, the term "good optical quality" means that any incoming wavefront is essentially duplicated in the reflected beams. If the test surface 22 is not optically reflective and of good optical quality, then mirrors of good optical quality may be mounted at the target areas 18,20. The two light beams 10,12 have a fixed offset frequency ($\Delta f$) between them and may be derived from a single frequency laser source such as a HeNe laser. The difference in frequency, $\Delta f$, is typically within the radio frequency (RF) range. As used herein, the term "radio frequency range" means a range between 20 Kilohertz and 1000 Megahertz. Beams 10,12 are directed to reflect off of their target areas 18,20 and to converge at a distance, L, from the test surface 22 after reflection. The light beams 10,12 converge at an angle $\theta$ toward an interference zone 24 and produce an optical radiation field which is spatially and temporally modulated by the $\Delta f$.

Figure 2:
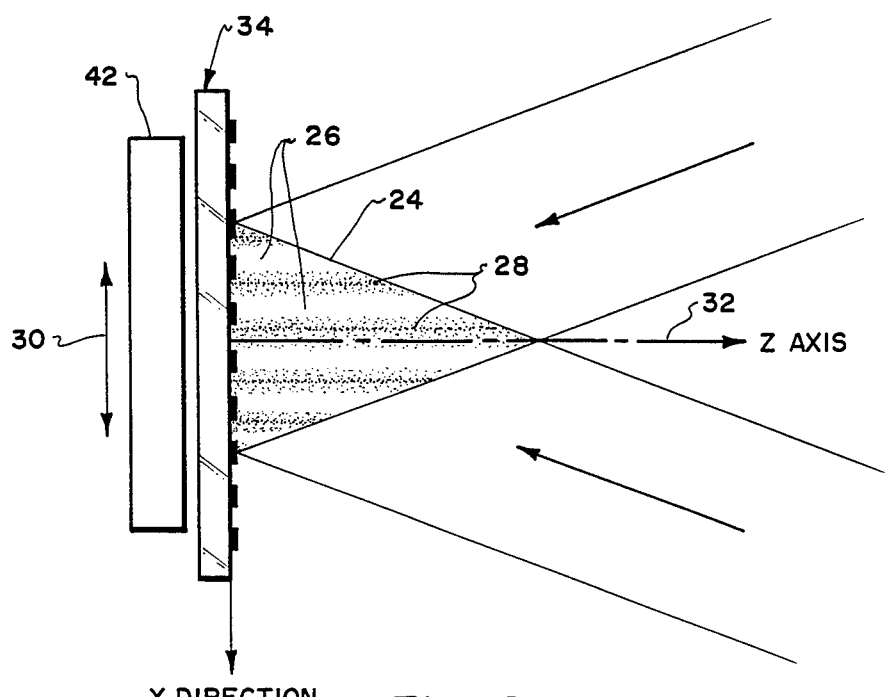
FIG. 2 is an enlarged diagrammatic illustration showing the cross-over of the converging beams shown in FIG. 1 and resulting in a moving interference fringe pattern zone.

This zone of interference 24 is illustrated in FIG. 2 and includes a pattern of alternating dark and light bands 26,28 or interference fringes. The fringes move in the direction shown by arrow 30 at a rate equal to $\Delta f$. FIGS. 1 and 2 show the relative positions of the X, Y and Z axes. The Y and Z axes lie in the plane of the paper in FIG. 2 and the X axis is perpendicular to the paper. The bisector 32 of the converging beams 10,12 is positioned along the Z-axis. The fringe planes are parallel to the X-Z plane and the fringes move in the Y direction. The fringe spacing or spatial period, $\lambda_s$, is determined by the equation:

$$\lambda_s = \lambda_o / 2 \sin (\theta/2)$$

where $\lambda_o$ is the optical wavelength of the incident laser beams.

A sampling means such as a slitted element 34 illustrated in FIGS. 1–4 is positioned to be perpendicular to the Y-Z plane such that it is immersed within the zone of interference 24. The slitted element 34 should be centered within the zone of interference 24 as shown in FIG. 2.

Figure 3:
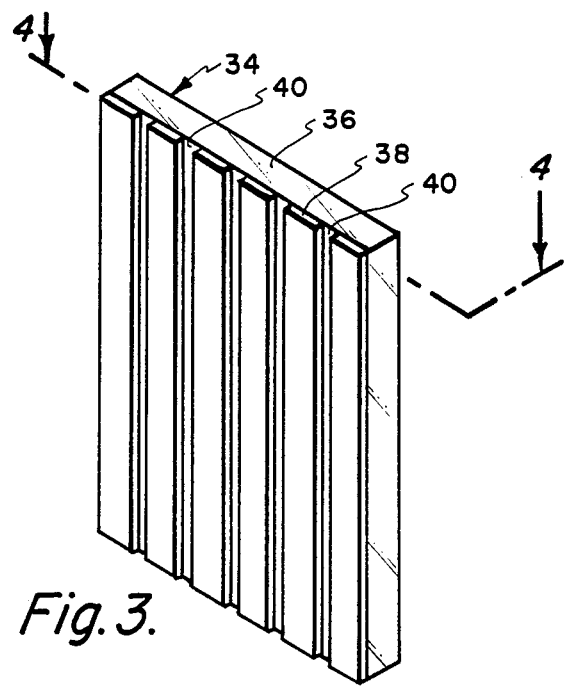
FIG. 3 is an enlarged view of the slitted element with a plurality of evenly spaced, parallel slits formed on a transparent support structure.
Figure 4:
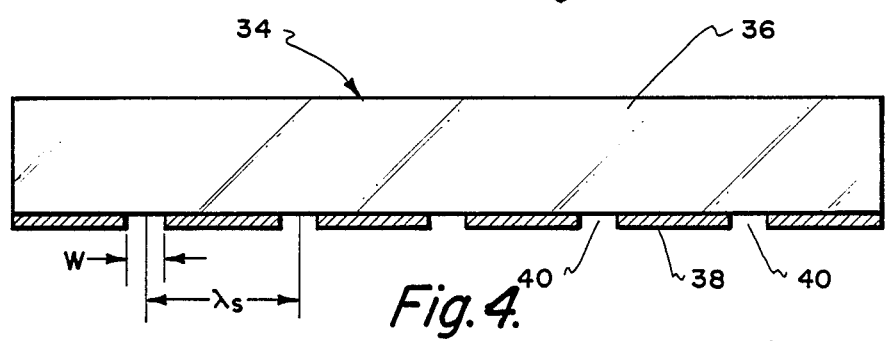
FIG. 4 is a cross-sectional view of the slitted element taken along line 4—4 of FIG. 3.

FIGS. 3 and 4 show enlarged views of one possible embodiment of a slitted element 34. The element 34 may, as shown in these Figures, comprise a transparent support structure 36, such as glass, and an opaque surface 38 having slits 40 formed on the support structure 36. Surface 38 may, for example, be aluminized. A light detector 42 is positioned behind the slitted element 34. The light that is transmitted through the slits or apertures 40 in the slitted element 36 provides the sample that is used for measuring the angular displacement of the test surface 22. Thus, the slitted element 36 and the detector behind it 42, should have sufficient length to be able to cover the range of travel of interference zone 24.

The slit width, w, must be smaller than the spatial period of the fringe field, $\lambda_s$. Typically, it is desirable to make w to be approximately one half of $\lambda_s$.

Slitted element 34 may contain a plurality of parallel, equally spaced slits 40 or only a single slit. If a plurality of slits are utilized then the fringe period, $\lambda_s$, should be substantially equal to the center-to-center distance between the slits (assuming that the plane of slitted element 34 is perpendicular to the fringe planes). Use of a plurality of slits 40 provides more signal and a beneficial averaging effect.

The light detector 42 receives the modulated optical radiation which is sampled from the interference zone. The modulated optical radiation is converted into a sample electronic signal by associated electronic circuits.

Figure 5:
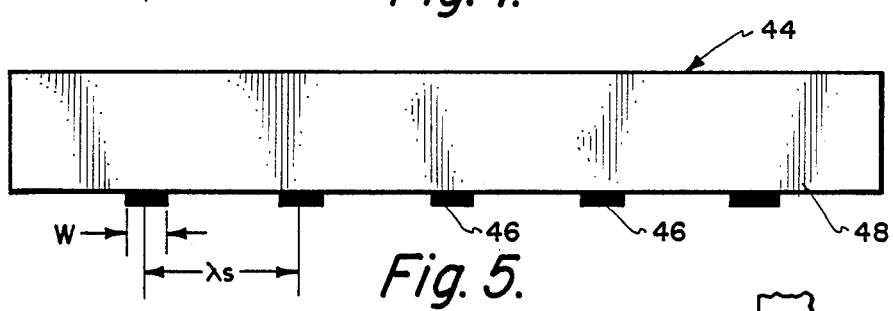
FIG. 5 is a cross-sectional view of a grating element having a periodic structure of perturbations attached to a support structure.

Inasmuch as the function of the slitted element 34 is to sample a portion of the optical radiation within the interference zone various other types of sampling means are also contemplated. For example, FIG. 5 illustrates a grating element 44 as a sampling means. In this embodiment an array of thin parallel metal strips 46 or wires are deposited on an optically flat support substrate 48. The support substrate 48 can be either opaque or transparent.

Figure 6:
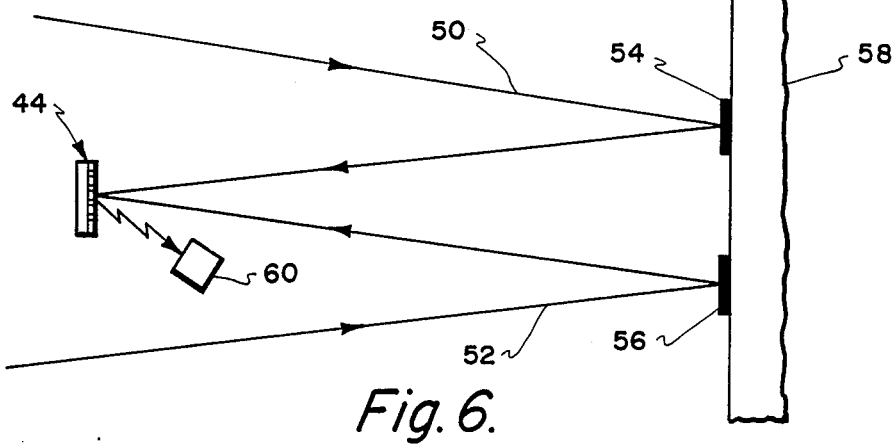
FIG. 6 is a diagrammatic illustration of an embodiment of the invention wherein the signal detector utilizes backscattered optical radiation from a grating element.

Utilization of this grating element 44 is illustrated in FIG. 6. Light beams 50,52 are reflected off of targets 54,56 on test surface 58. The backscattered radiation from the grating element 44 is detected by the light detector 60. When a grating element is used for sampling, the width of each of the metal strips or wires should be less than $\lambda_s$. Furthermore, the center-to-center distance between the strips or wires should be substantially equal to $\lambda_s$.

Figure 7:
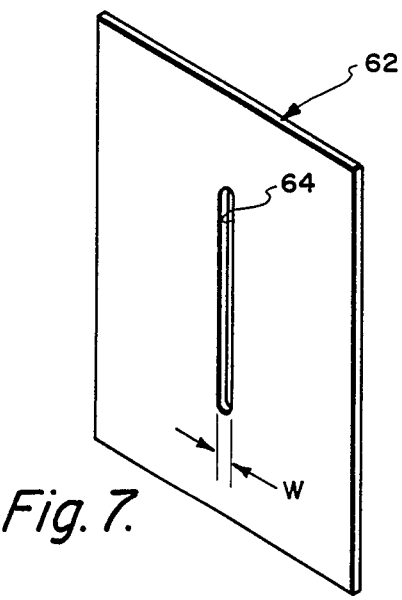
FIG. 7 is an enlarged view of a slitted element comprising a metal membrane with a slit etched therein.

Another embodiment of a sampling means is illustrated in FIG. 7 and includes a thin metal plate 62 with a slit 64 etched therein. (Alternatively, a plurality of slits may be etched into the metal plate 62.) If such a metal plate 62 is used, no transparent support structure is required. Utilization of a metal plate 62 as a slitted element has the advantage of locating the light detector 42 behind the metal plate 62 as closely as possible to the slit(s) 64. The metal plate 62 may typically be a few mils thick or less.

Referring back to FIG. 1, when it is desired to make a measurement of angular displacement, the test surface 22 is rotated (as shown by arrows 66) about the X-axis thereby causing lateral displacement (i.e. along the Y-axis) of the fringe pattern 24 with respect to the slitted element 34 and light detector 42.

The phase of the RF signal component of the radiation transmitted through the slitted element 34 is continuously determined by comparing the phase of the electronic signal generated by the detector circuitry to the phase of a reference signal having a constant phase and a frequency equal to $\Delta f$, as the test surface 22 changes angular positions.

Figure 8A:
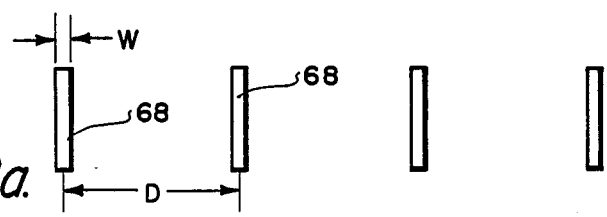
FIG. 8a is a schematic illustration of an array of evenly spaced slits.
Figure 8B:
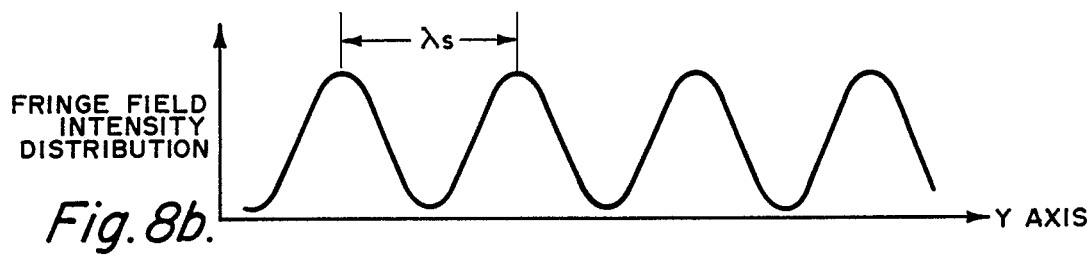
Figure 8C:
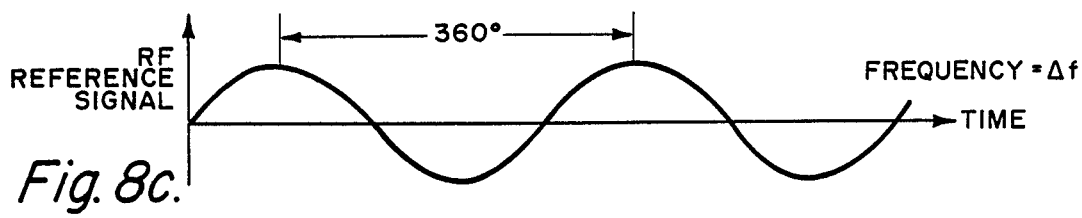
FIG. 8c is a graph of an RF reference electronic signal having a frequency equal to $\Delta f$.
Figure 8D:
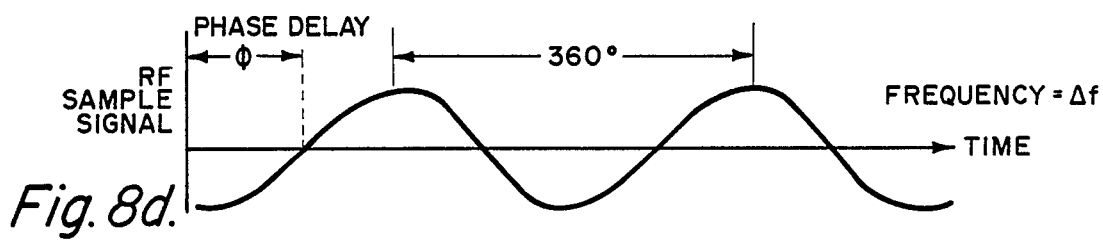
FIG. 8d is a graph of the sample electronic signal (with frequency equal to $\Delta f$) from the transmitted RF modulated optical radiation.

The magnitude and direction of the phase shift occurring when the test surface 22 changes angular position very precisely indicates the extent and direction of that angular displacement. FIG. 8a illustrates an array of evenly spaced slits 68 within a slitted element. A graph of the corresponding spatial fringe field intensity distribution is provided in FIG. 8b. The periodicity, D, of the slits is equal to $\lambda_s$. A graph of an RF reference electronic signal having a frequency equal to $\Delta f$ is shown in FIG. 8c and a graph of the sample electronic signal from the transmitted RF modulated optical radiation is provided as FIG. 8d. Rotation of the test surface is sensed by comparing the phase of the sample electronic signal to the reference electronic signal. The extent and direction of the angular displacement of the test surface may be determined by measuring the magnitude and direction of the phase shift between the sample electronic signal and the reference electronic signal.

Figure 9:
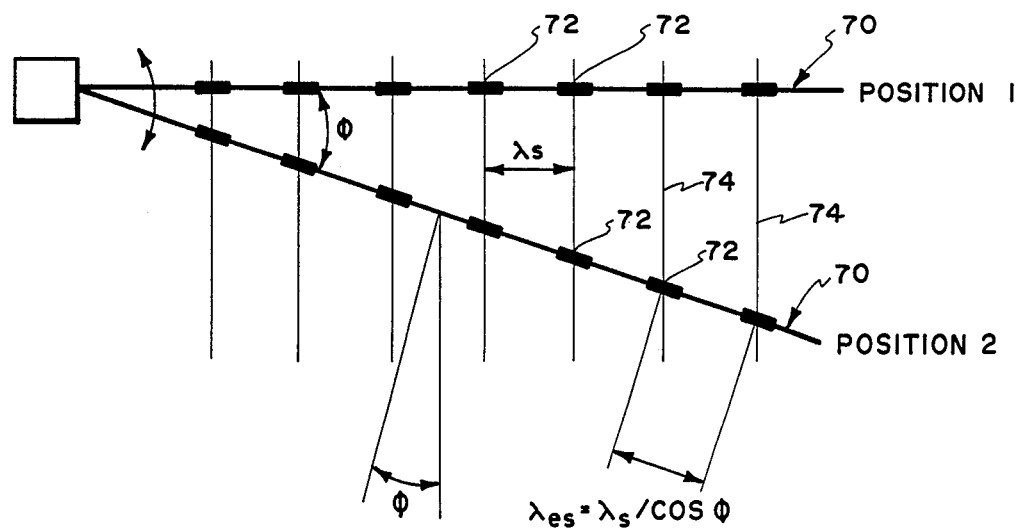
FIG. 9 contains illustrations of the geometrical relationships between fringe planes of an optical interference zone and a sampling component with evenly spaced perturbations. In position 1 the sampling component is perpendicular to the fringe planes, while in position 2 the sampling component meets the fringe planes at an oblique angle.

As previously noted, when a sampling means is used which includes a plurality of sampling apertures such as a plurality of slits, wires or grating strips, the center-to-center distance between the sampling apertures should be equal to the fringe period, $\lambda_s$. However, this relationship only applies when the sampling apertures lie in a plane that is perpendicular to the fringe planes. Thus, for example, in the instance of a slitted element, if the slitted element is rotated out of the perpendicular plane, the slit separation must be made to match the projection of the rotated slitted element on the perpendicular plane. FIG. 9 illustrates this concept. In position 1 a slitted element 70 with slits 72 lies perpendicular to the fringe planes 74. If, however, the slitted element 70 is rotated to position 2 then the spacing between the slits 72 must be increased to $\lambda_s/\cos\phi$, where $\phi$ is the angle of rotation. Thus, the fringe plane spacing is matched.

In the event that a sampling means (i.e. a slitted element or grating element) is utilized which includes a plurality of sampling apertures with fixed spacings, the tilt sensor can be calibrated to match a given fringe pattern. This may be accomplished by rotating the sampling means until the projection of the sampling apertures on the plane perpendicular to the fringe planes matches the fringe period. Another method for matching the fringe period to the sampling aperture spacing could be by changing the angle of convergence of the two converging beams.

In view of the above discussion, a general system may be viewed in terms of an "effective" spatial period of the fringe field, $\lambda_{es}$, where $\lambda_{es}=\lambda_s/\cos\phi$. The parameter $\phi$ is the angular deviation of the plane of the sampling aperture(s) from a plane which is perpendicular to the fringe planes. Thus, in terms of such a generalized system the sampling aperture(s) must have a width smaller than $\lambda_{es}$.

Figure 10:
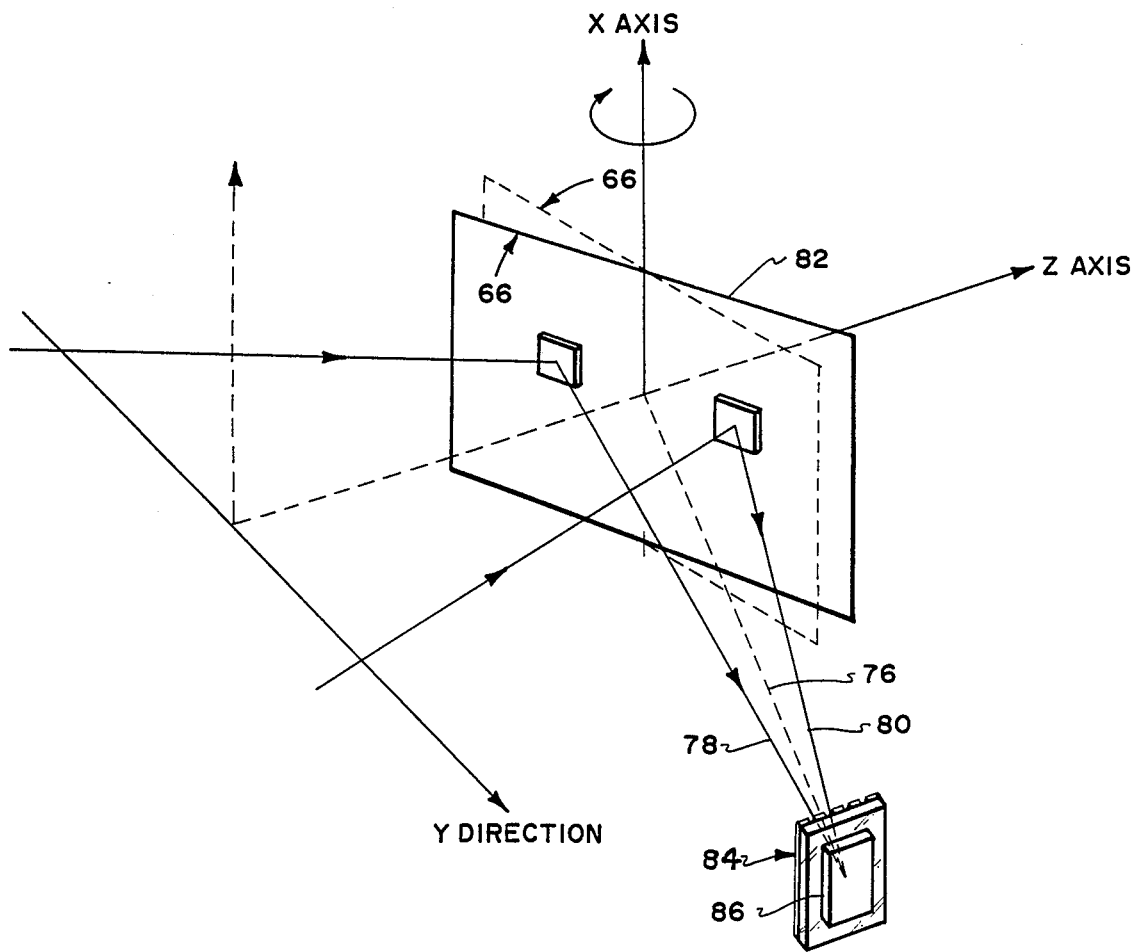
FIG. 10 is a diagrammatic illustration of an "off-axis" embodiment of the present invention.

The embodiment shown in FIG. 1 is configured to detect the optical radiation that is transmitted through a slitted element "on axis". FIG. 10, on the other hand, illustrates an "off-axis" embodiment. In the off-axis situation, the bisector 76 of the two converging laser beams 78, 80 downstream from test surface 82 is folded out of the Z-axis. This allows positioning of the sampling means 84, and the detector 86 in its vicinity, to be placed away from the source platform, in a location that may be more convenient in some specialized application.

This invention may be utilized in applications where the test surface must be maintained in a highly stationary angular position. For example, the components in a space telescope must maintain their angular positions with respect to one another. In this example, any angular movement must be monitored with high angular resolution and precision to be able to counteract any discernible angular movement such as drift or angular vibrations.

The invention may also be utilized for precision angular positioning of a test surface with respect to a reference frame. For example, beam steering systems require high precision angular repositioning of their components. The components of a space based beam steering system may be hundreds of feet apart and their relative angular movement may have to be monitored (and controlled) with submicroradian accuracy.

Yet another application of the present invention is for precision monitoring of the angular vibration of a test surface. For example, rocket engine test stands require precision monitoring of angular vibrations in order to detect any uncharacteristic behavior. The hostile environment surrounding an operating rocket engine requires that a remote sensor be used to measure the PSD (power spectral density) distribution of the angular vibration.

The preceding examples emphasize the unique abilities of the present invention to monitor angular displacement of surfaces located in particularly difficult environments. The following numerical example illustrates the outstanding sensitivity of the present invention.

EXAMPLE

A HeNe laser is utilized with a wavelength, $\lambda_o=0.6328\mu$. The distance, L, between each of the targets and the interference zone is 20 cm and the distance, d, between the targets is 1 cm.

The fringe field spacing, $\lambda_s$, is determined by the equation $\lambda_s=\lambda_o/2\sin(\theta/2)$, where $\theta/2=\tan^{-1}(d/2L)$. Therefore, in this instance $\lambda_s=12.66\mu$.

If the test surface changes by an angle, $\alpha$, equal to $1\mu$ rad, then the fringe field moves laterally by $L\cdot\tan 2\alpha$ ($=0.4\mu$). This is 3.16% of a full cycle, i.e. 3.16% of $\lambda_s$ (11.37° of electronic phase.) It is noted that digital heterodyne interferometric methods at Rockwell International routinely provide, using standard electronic phase measuring gear, measurements of one part in one-thousand of a full cycle of phase. (This technology is discussed in U.S. Pat. No. 4,188,122 issued to N. A. Massie and S. Holly entitled, "Interferometer".)

The above example demonstrates that better than 100 nanoradian local surface tilts may easily be measured when base distances of 1 cm are used. This translates to 10 angstroms over this distance ($\sim 10$ mm), or in terms of optical wavelength $<\lambda/600$.

The dynamic range, i.e. range of angles of the test surface that may be measured, depends on the diameters of the individual beams, i.e. depends on the AC fringe field diameter in addition to the distance between the test surface and the sampling means.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for remotely sensing the angular displacement of a test surface, comprising:
   a. producing two collimated light beams of substantially the same intensity which are coherent with respect to one another, one of said beams having a different frequency from the other beam, the frequency difference, $\Delta f$, being within the radio frequency (RF) range;
   b. directing each of said light beams toward separate optically reflective, good optical quality target areas on said test surface, said light beams being directed to reflect off of their respective target areas and to converge at a distance from said test surface thus forming a fringe pattern at said distance in an interference zone and producing an optical radiation field which is spatially and temporally modulated by the Δf, said fringe pattern continuously moving laterally along a direction perpendicular to the fringe planes of the interference zone at a rate equal to Δf;

c. positioning a sampling means within the interference zone for sampling the laterally moving fringe pattern, said sampling means having at least one sampling aperture exposed to said interference zone, said at least one sampling aperture lying in a plane substantially perpendicular to a plane formed by the converging light beams, and having a width smaller than the effective spatial period of the fringe field, $\lambda_{es}$, where $\lambda_{es}=\lambda_s/\cos\phi$, $\lambda_s$ being the spatial period of the fringe field and $\phi$ being the angular deviation of the plane of the sampling aperture from a plane which is perpendicular to said fringe planes;

d. positioning a light detector to receive said modulated optical radiation which is sampled from the interference zone, said modulated optical radiation being converted into a sample electronic signal by associated electronic circuits; and e. sensing rotation of said test surface about the X-axis which is normal to the converging light beams by comparing the phase of said sample electronic signal to the phase of a reference electronic signal having a frequency equal to Δf.

2. The method of claim 1 further including the step of measuring the magnitude and direction of the phase shift between said sample electronic signal and said reference electronic signal to determine the extent and direction of the angular displacement of the test surface.

3. The method of claim 2 wherein said test surface is positioned to be essentially perpendicular to a bisector of said converging beams.

4. The method of claim 2 wherein said sampling means includes a slitted element, said slitted element having at least one slit formed therein and being positioned such that the slit formed on the slitted element is perpendicular to the plane formed by the converging light beams, the slit having a width smaller than the effective spatial period, $\lambda_{es}$.

5. The method of claim 4, wherein said slitted element includes a plurality of slits formed therein, $\lambda_{es}$ being substantially equal to the center-to-center distance between the slits.

6. The method of claim 4, wherein said slitted element includes a transparent support structure with an opaque surface formed on a side of the support structure, said opaque surface having said at least one slit formed therein.

7. The method of claim 4, wherein said slitted element includes a thin metal plate with said at least one slit formed therein.

8. The method of claim 2, wherein said sampling means includes a grating element comprising an optically flat substrate with an array of thin, parallel, metal strips deposited thereon, the width of each of said metal strips being less than $\lambda_{es}$, said light detector being positioned to detect backscattered radiation from said grating element.

9. The method of claim 2, wherein said at least one sampling aperture lies in a plane perpendicular to the fringe planes, $\lambda_s$ being equal to $\lambda_{es}$.

10. A method for measuring the angular displacement of a test surface, comprising:
a. producing two collimated light beams of substantially the same intensity which are coherent with respect to one another, one of said beams having a different frequency from the other beam, the frequency difference, Δf, being within the radio frequency (RF) range;
b. directing each of said light beams toward separate optically reflective, good optical quality target areas on said test surface, said light beams being directed to reflect off of their respective target areas and to converge at a distance from said test surface thus forming a fringe pattern at said distance in an interference zone and producing an optical radiation field which is spatially and temporally modulated by the Δf, said fringe pattern continuously moving laterally along a direction perpendicular to the fringe planes of the interference zone at a rate equal to Δf;
c. positioning a slitted element within the interference zone for sampling the laterally moving fringe pattern, said slitted element having at least one slit formed therein which is exposed to said interference zone, said at least one slit lying in a plane substantially perpendicular to a plane formed by the converging light beams, and having a width smaller than the effective spatial period of the fringe field, $\lambda_{es}$, where $\lambda_{es}$ is equal to $\lambda_s/\cos\phi$, $\lambda_s$ being the spatial period of the fringe field and $\phi$ being the angular deviation of the plane of the slitted element from a plane which is perpendicular to said fringe planes;
d. positioning a light detector to receive said modulated optical radiation which is sampled from the interference zone, said modulated optical radiation being converted into a sample electronic signal by associated electronic circuits;
e. determining the extent and direction of the angular displacement of the test surface by measuring the magnitude and direction of the phase shift between said sample electronic signal and a reference electronic signal having a frequency equal to Δf.

11. The method of claim 10 wherein said test surface is positioned to be essentially perpendicular to a bisector of said converging beams.

12. The method of claim 10, wherein said slitted element includes a plurality of slits formed therein, the center-to-center distance between the slits being substantially equal to $\lambda_{es}$.

13. The method of claim 10, wherein said slitted element includes a transparent support structure with an opaque surface formed on a side of the support structure, said opaque surface having said at least one slit formed therein.

14. The method of claim 10, wherein said slitted element includes a thin metal plate with said at least one slit formed therein.

15. An apparatus for remotely sensing the angular displacement of a test surface, comprising:
a. means for producing two collimated light beams of substantially the same intensity which are coherent with respect to one another, one of said beams having a different frequency from the other beam, the frequency difference, Δf, being within the radio frequency (RF) range;
b. means for directing each of said light beams toward separate optically reflective, good optical quality target areas on said test surface, said light beams being directed to reflect off of their respective target areas and to converge at a distance from said test surface thus forming a fringe pattern at said distance in an interference zone and producing an optical radiation field which is spatially and temporally modulated by the Δf, said fringe pattern continuously moving laterally along a direction perpendicular to the fringe planes of the interference zone at a rate equal to Δf;

c. sampling means positioned within the interference zone for sampling the laterally moving fringe pattern, said sampling means having at least one sampling aperture exposed to said interference zone, said at least one sampling aperture lying in a plane substantially perpendicular to a plane formed by the converging light beams, and having a width smaller than the effective spatial period of the fringe field, $\lambda_{es}$, where $\lambda_{es} = \lambda_s/\cos\phi$, $\lambda_s$ being the spatial period of the fringe field and $\phi$ being the angular deviation of the plane of the sampling aperture from a plane which is perpendicular to said fringe planes;

d. a light detector positioned to receive said modulated optical radiation which is sampled from the interference zone, said modulated optical radiation being converted into a sample electronic signal by associated electronic circuits; and e. comparing means for comparing the phase of said sample electronic signal to the phase of a reference electronic signal having a frequency equal to Δf and thereby sensing rotation of said test surface.

16. The appartus of claim 15 wherein said comparing means includes measuring means for measuring the magnitude and direction of the phase shift between said sample electronic signal and said reference electronic signal to determine the extent and direction of the angular displacement of the test surface.

17. The apparatus of claim 16, wherein said test surface is located essentially perpendicular to a bisector of said converging beams.

18. The apparatus of claim 16, wherein said sampling means includes a slitted element, said slitted element having at least one slit formed therein and being positioned such that the slit formed on the slitted element is perpendicular to the plane formed by the converging beams, the slit having a width smaller than the effective spatial period, $\lambda_{es}$.

19. The apparatus of claim 18, wherein said slitted element includes a plurality of slits formed therein, the center-to-center distance between the slits being substantially equal to $\lambda_{es}$.

20. The apparatus of claim 18, wherein said slitted element includes a transparent support structure with an opaque surface formed on a side of the support structure, said opaque surface having said at least one slit formed therein.

21. The apparatus of claim 18, wherein said slitted element includes a thin metal plate with said at least one slit formed therein.

22. The apparatus of claim 16, wherein said sampling means includes a grating element comprising an optically flat substrate with an evenly spaced array of thin, parallel, metal strips deposited thereon, the width of each of said metal strips being less than $\lambda_{es}$, said light detector being positioned to detect backscattered radiation from said grating element.

23. The apparatus of claim 16, wherein said at least one sampling aperture lies in a plane perpendicular to the fringe planes, $\lambda_s$ being equal to $\lambda_{es}$.

24. An apparatus for measuring the angular displacement of a test surface, comprising:

a. means for producing two collimated light beams of substantially the same intensity which are coherent with respect to one another, one of said beams having a different frequency from the other beam, the frequency difference, Δf, being within the radio frequency (RF) range;

b. means for directing each of said light beams toward separate optically reflective, good optical quality target areas on said test surface, said light beams being directed to reflect off of their respective target areas and to converge at a distance from said test surface thus forming a fringe pattern at said distance in an interference zone and producing an optical radiation field which is spatially and temporally modulated by the Δf, said fringe pattern continuously moving laterally along a direction perpendicular to the fringe planes of the interference zone at a rate equal to Δf;

c. a slitted element positioned within the interference zone for sampling the laterally moving fringe pattern, said slitted element having at least one slit formed therein which is exposed to said interference zone, said at least one slit lying in a plane substantially perpendicular to a plane formed by the converging light beams, and having a width smaller than the effective spatial period of the fringe field, $\lambda_{es}$, where $\lambda_{es}$ is equal to $\lambda_s/\cos\phi$, $\lambda_s$ being the spatial period of the fringe field and $\phi$ being the angular deviation of the plane of the slitted element from a plane which is perpendicular to said fringe planes;

d. a light detector positioned to receive said modulated optical radiation which is sampled from the interference zone, said modulated optical radiation being converted into a sample electronic signal by associated electronic circuits; and e. measuring means for measuring the magnitude and direction of the phase shift between said sample electronic signal and a reference electronic signal having a frequency equal to Δf for determining the extent and direction of the angular displacement of the test surface.

25. The apparatus of claim 24 wherein said test surface is positioned to be essentially perpendicular to a bisector of said converging beams.

26. The apparatus of claim 24, wherein said slitted element includes a plurality of slits formed therein, $\lambda_{es}$ being substantially equal to the center-to-center distance between the slits.

27. The apparatus of claim 24, wherein said slitted element includes a transparent support structure with an opaque surface formed on a side of the support structure, said opaque surface having said at least one slit formed therein.

28. The apparatus of claim 24, wherein said slitted element includes a thin metal plate with said at least one slit formed therein.

* * * * *